US012179713B2

(12) United States Patent
Renoux et al.

(10) Patent No.: US 12,179,713 B2
(45) Date of Patent: Dec. 31, 2024

(54) ASSEMBLY FOR THE ARTICULATED CONNECTION OF A CONNECTING ROD AND A CRANKPIN OF A MOTOR VEHICLE WINDOW WIPING MECHANISM

(71) Applicant: Valeo Systemes d'Essuyage, La Verriere (FR)

(72) Inventors: Pascal Renoux, La Verriere (FR); Nicolas Kuchly, La Verriere (FR); Robin Viard, La Verriere (FR); Loic Roussel, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 596 days.

(21) Appl. No.: 17/268,997

(22) PCT Filed: Jul. 24, 2019

(86) PCT No.: PCT/EP2019/069880
§ 371 (c)(1),
(2) Date: Feb. 17, 2021

(87) PCT Pub. No.: WO2020/052844
PCT Pub. Date: Mar. 19, 2020

(65) Prior Publication Data
US 2021/0323506 A1 Oct. 21, 2021

(30) Foreign Application Priority Data
Sep. 10, 2018 (FR) ..................................... 1858106

(51) Int. Cl.
*B60S 1/24* (2006.01)
*F16C 11/06* (2006.01)

(52) U.S. Cl.
CPC ............. *B60S 1/24* (2013.01); *F16C 11/0623* (2013.01)

(58) Field of Classification Search
CPC ......................... B60S 1/0447; F16C 2326/09
See application file for complete search history.

(56) References Cited

U.S. PATENT DOCUMENTS 3,299,737 A * 1/1967 Hurlin ....................... B60S 1/24
74/595
3,776,649 A * 12/1973 Kemezys ............... F16C 11/069
403/90

(Continued)

FOREIGN PATENT DOCUMENTS

DE 102012201887 A1 * 8/2013 ................ B60S 1/24
DE 202015005870 U1 * 1/2017 ............ F16B 21/073

(Continued)

OTHER PUBLICATIONS

European Patent Office, International Search Report (w/English Translation) and Written Opinion of International Application No. PCT/EP2019/069880, dated Sep. 27, 2019.

(Continued)

*Primary Examiner* — Matthew R McMahon
(74) *Attorney, Agent, or Firm* — Valeo Systemes d'Essuyage

(57) ABSTRACT

The invention relates to an assembly comprising a crankpin which includes a ball joint, and a connecting rod which carries a ball joint housing, wherein the ball joint housing and the connecting rod are assembled by a bayonet mounting, and wherein the connecting rod comprises a locking hole through which an axial section of the ball joint housing passes, the connecting rod comprises at least one locking lug, the ball joint housing comprises a locking notch which is defined by two opposing radial faces, characterized in that one of the two opposing radial faces of the locking notch and one facing face of the locking lug each have a complemen- (Continued)

tary inclined profile in order, during the rotation, to cause an axial clamping of the locking lug in-side the locking notch.

10 Claims, 4 Drawing Sheets

(56) References Cited

U.S. PATENT DOCUMENTS

| | | | |
|---|---|---|---|
| 3,787,129 A | | 1/1974 | Kohler et al. |
| 3,853,414 A | * | 12/1974 | Hirano ................ F16C 11/0657 403/349 |
| 4,916,774 A | | 4/1990 | Arlon et al. |
| 5,368,427 A | * | 11/1994 | Pfaffinger ............... F16B 21/04 24/DIG. 54 |
| 7,743,457 B2 | * | 6/2010 | Metz ....................... F16B 21/09 15/250.31 |
| 10,167,890 B2 | * | 1/2019 | Steffenfauseweh ... F16B 21/075 |
| 10,612,583 B2 | * | 4/2020 | Jozwiak ................. F16C 11/06 |
| 2016/0108950 A1 | | 4/2016 | Steffenfauseweh et al. |
| 2020/0166067 A1 | * | 5/2020 | Janssen .................. F16B 21/04 |

FOREIGN PATENT DOCUMENTS

| | | |
|---|---|---|
| FR | 2228172 A1 | 11/1974 |
| FR | 2608233 A1 | 6/1988 |
| FR | 2630068 A1 | 10/1989 |
| FR | 2764952 A1 | 12/1998 |
| FR | 2911649 A1 | 7/2008 |
| FR | 2984829 A1 | 6/2013 |
| GB | 857905 A | 9/1959 |
| GB | 1471675 A | 4/1977 |
| GB | 1587051 A | 3/1981 |
| WO | 2014198562 A1 | 12/2014 |
| WO | 2018024539 A1 | 2/2018 |

OTHER PUBLICATIONS

China National Intellectual Property Administration, Search Report of corresponding Chinese Application No. 201980059117.8, dated Mar. 30, 2023.

* cited by examiner

ASSEMBLY FOR THE ARTICULATED CONNECTION OF A CONNECTING ROD AND A CRANKPIN OF A MOTOR VEHICLE WINDOW WIPING MECHANISM

CROSS-REFERENCE TO RELATED APPLICATIONS

This application is filed under 35 U.S.C. § 371 U.S. National Phase of International Application No. PCT/EP2019/069880 filed Jul. 24, 2019 (published as WO2020/052844), which claims priority benefit to French application No. 1858106 filed Sep. 10, 2018, the disclosures of which is herein incorporated by reference in their entirety.

TECHNICAL FIELD OF THE INVENTION

The invention relates to an assembly belonging to a movement transmission mechanism for driving the rotation of a motor vehicle wiper in which a ball-joint housing a movement transmission connecting rod are assembled by bayonet fitting.

TECHNICAL BACKGROUND OF THE INVENTION

The invention relates to an arrangement for articulating an end of a connecting rod to an end of a crank using a ball-joint connection.

The connecting rod and the crank are two components of a linkage of a wiping mechanism for a motor vehicle.

Such a mechanism notably transmits movement and is of the type comprising a rotary shaft rotationally connected to the first end of a crank of which the second end bears a crankpin which is designed to be connected to a connecting rod, for example a driving connecting rod, belonging to a movement-transmission linkage for driving the rotation of a motor vehicle wiper.

The design of the assembly comprising the crank, the crankpin which extends in an axial overall direction orthogonal overall to the plane in which the crank extends, and the rotary shaft which likewise extends in an axial overall direction orthogonal overall to the plane in which the crank extends, is such that the crankpin and the supporting shaft are connected in rotation to the crank and fixed reliably thereto.

Regarding for example the crankpin-crank connection, an axial portion (44) of the crankpin is passed axially through a complementing hole in the crank and is immobilized axially with respect to the crank, for example mounted in the complementary hole using crimping.

The crankpin and the crank thus form a structural subassembly. The crank-driveshaft connection may also use the same design.

Such a mechanism has an arrangement for connecting one end of the connecting rod to one end of the associated crank.

As is known, for example, from document FR-A1-2,911,649, the arrangement may comprise:
  a crankpin which is mounted on the end of the crank, which extends along its main axis from the end of the crank as far as the end of the associated connecting rod, and in which the free end of the crankpin is shaped as a ball-joint ball;
  an assembly and connecting component referred to as "ball-joint housing" which is borne by the end of the connecting rod and which delimits a concave spherical housing portion inside of which the ball at the free end of the crankpin is housed with the freedom to rotate.

The ball-joint housing is made of an elastically deformable plastic material so as to allow the ball at the free end of the crankpin to be push-fitted elastically into the housing portion of the ball-joint housing.

The connecting rod and the crank are thus articulated relative to one another by a connection of the ball-joint type.

Such an arrangement is associated for example with a bearing associated with a movement-transmitting connecting rod connecting two associated bearings to a reduction drive motor common to two wipers of a motor vehicle wiping mechanism.

As is known, in order to assemble the connecting rod and the ball-joint housing, recourse may be had to an assembly in which the ball-joint housing and the connecting rod are assembled using bayonet fitting, and in which:
  the connecting rod has a locking hole through which there passes axially, from the bottom up, an intermediate axial section of the ball-joint housing;
  the connecting rod comprises at least one locking lug belonging to the bayonet fitting;
  the ball-joint housing comprises a radial locking groove, belonging to the bayonet fitting, and delimited by two opposite radial faces;
  the ball-joint housing is locked in axial position with respect to the connecting rod by relative rotation of the ball-joint housing with respect to the connecting rod by engaging said at least one locking lug in the radial locking groove.

The bayonet fitting is thus achieved by performing a combination of consecutive relative movements of "pushing and turning" the connecting rod with respect to the ball-joint housing.

An example is illustrated in document FR-A1-2,630,068.

The invention seeks to propose an improved assembly belonging to a movement-transmission mechanism for driving the rotation of a motor vehicle wiper, this assembly comprising a crankpin, of axial orientation, which comprises a ball-joint ball, and a connecting rod which bears a ball-joint housing that houses the ball-joint ball, in which assembly the ball-joint housing and the connecting rod are assembled by bayonet fitting of the abovementioned type.

BRIEF SUMMARY OF THE INVENTION

The invention proposes an assembly belonging to a movement-transmission mechanism for driving the rotation of a motor vehicle wiper, this assembly comprising a crankpin, of axial orientation, which comprises a ball-joint ball, and a connecting rod which bears a ball-joint housing that houses the ball-joint ball, in which assembly the ball-joint housing and the connecting rod are assembled by bayonet fitting, and in which:
  the connecting rod has a locking hole through which there passes axially, from the bottom up, an axial section of the ball-joint housing;
  the connecting rod comprises at least one locking lug;
  the ball-joint housing comprises a locking notch which is delimited by two opposite radial faces;
  the ball-joint housing is locked in axial position with respect to the connecting rod by relative rotation of the ball-joint housing with respect to the connecting rod by engaging said at least one locking lug in the locking notch,
characterized in that one of the two opposite radial faces of the locking notch and a face opposite belonging to the locking lug each have inclined profiles that complement one another so that, upon said rotation, the locking lug becomes axially clamped inside the locking notch.

According to other features of the invention:

the convex lateral face of said section of the ball-joint housing and the concave internal wall of the locking hole have frustoconical profiles that complement one another so as to absorb, upon said axial clamping, any clearance between the axis of said section of the ball-joint housing and the axis of the locking hole in the connecting rod;

in an angular position in which said at least one locking lug is engaged in the locking notch, the ball-joint housing is blocked in terms of angular position with respect to the connecting rod by the elastic push-fitting of a blocking finger into a blocking recess;

the blocking finger is borne by an elastically deformable tab which is connected to the ball-joint housing, and the blocking recess is formed in the connecting rod;

the blocking finger extends in a direction parallel to the axis of rotation of the ball-joint housing with respect to the connecting rod;

the blocking finger and the blocking recess have profiles that complement one another so that when the ball-joint housing is in the locked angular position with respect to the connecting rod, any angular clearance between these two elements is absorbed;

the ball-joint housing comprises an upper section for grasping so as to rotate the ball-joint housing with respect to the connecting rod which comprises a central body and two radial wings extending out from the central body;

the external lateral contour of the upper section for grasping of the ball-joint housing complements the internal contour of the locking hole so as to allow the upper section for grasping of the ball-joint housing to be introduced axially from the bottom up through the locking hole;

the ball-joint housing comprises a lower annular plate of which the upper face constitutes one of the two opposite radial faces of the locking notch so as to allow the upper section of the ball-joint housing to be introduced axially from the bottom up through the locking hole until the connecting rod presses axially down against said upper face;

the locking notch is delimited axially:
  downward by said upper face of the lower annular plate;
  and upward by a lower face opposite, belonging to the upper section of the ball-joint housing consisting of two angular portions of which each is the lower face of one radial wing.

BRIEF DESCRIPTION OF THE FIGURES

Further features and advantages of the invention will become apparent from reading the following detailed description, for an understanding of which reference is made to the appended drawings, in which.

DETAILED DESCRIPTION OF THE FIGURES

Figure 1:
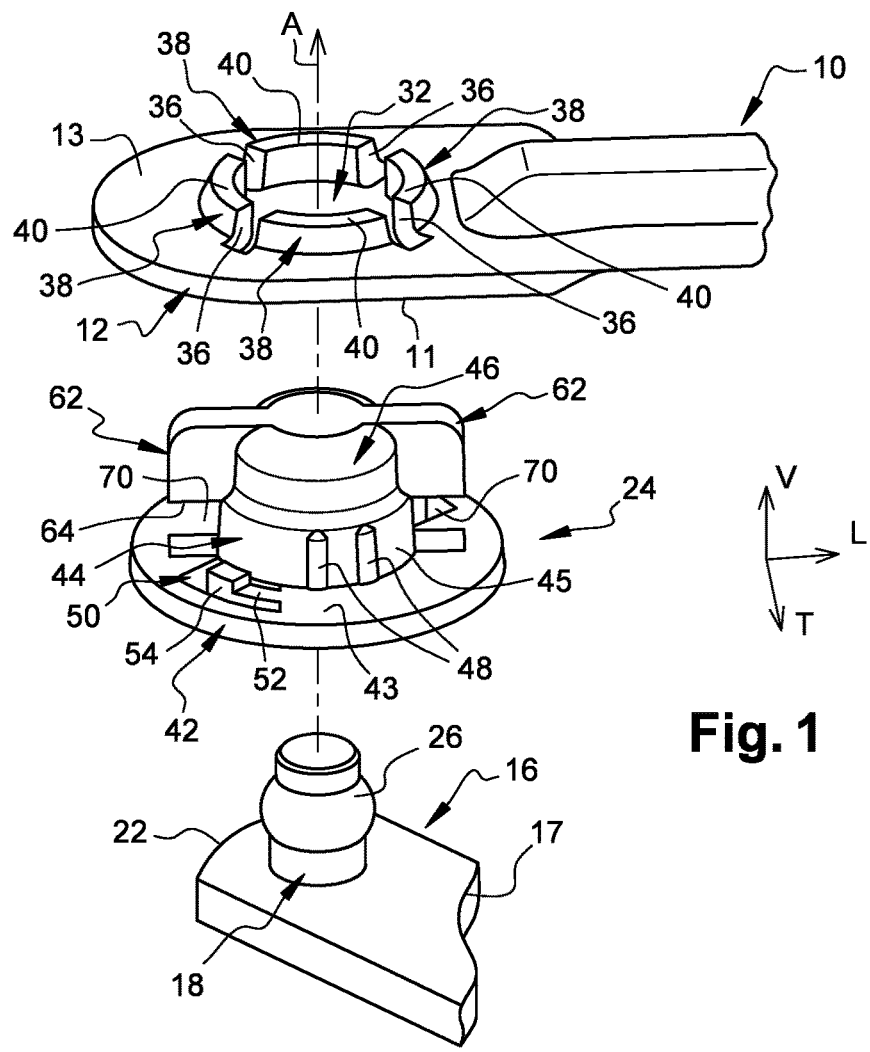
FIG. 1 is a partial depiction in exploded perspective of an arrangement comprising a crank associated with a crankpin, a ball-joint housing and a connecting rod which complement each other according to the invention.

In the rest of the description, elements having an identical structure or similar functions will be denoted by the same references.

In the rest of the description, longitudinal, vertical and transverse orientations will be adopted, in a non-limiting manner and without reference to the Earth's gravitational field, as indicated by the "L, V, T" trihedron in the figures. A horizontal plane that extends longitudinally and transversely is also defined.

A system for rotationally driving wipers (which are not depicted) notably comprises a reduction motor (not depicted) comprising an output shaft which constitutes a driveshaft for a wiper (not depicted), a connecting rod 10 for transmitting the rotational movement of the output shaft of the reduction motor to another driveshaft driving the rotation of another wiper (which has not been depicted).

The movement-transmitting connecting rod 10 comprises one end (not depicted) which is connected to the output shaft by a crank which is rotationally connected to the output shaft and which bears an axially oriented crankpin to which it is connected in rotation. The crankpin is connected to this end of the connecting rod 10 by a ball-joint connection of known design.

The connecting rod 10 has another end 12 which is connected to a driveshaft 14 by a crank 16 which is rotationally connected to the driveshaft 14.

This crank 16 bears a crankpin 18 oriented axially along a vertical axis A to which it is rotationally connected.

The crankpin 18 is connected to the end 12 of the connecting rod 10 by a connection of the ball-joint type of generally known design which will be described in further detail.

Figure 2:
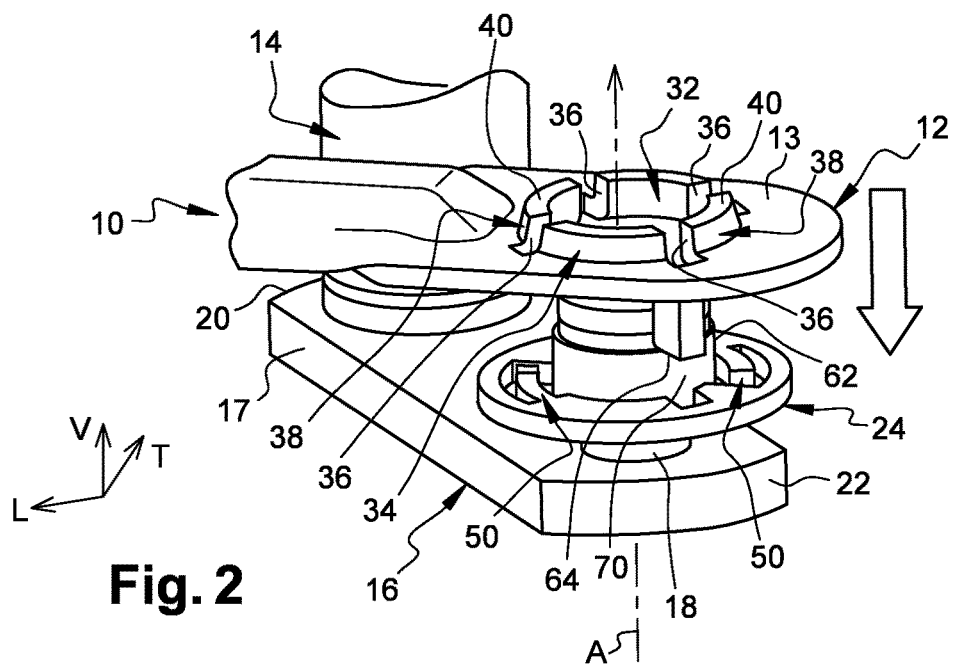
FIG. 2 is a perspective view of the elements depicted in FIG. 1, illustrating one type of bayonet-type fitting of the connecting rod to the ball-joint housing.
Figure 3:
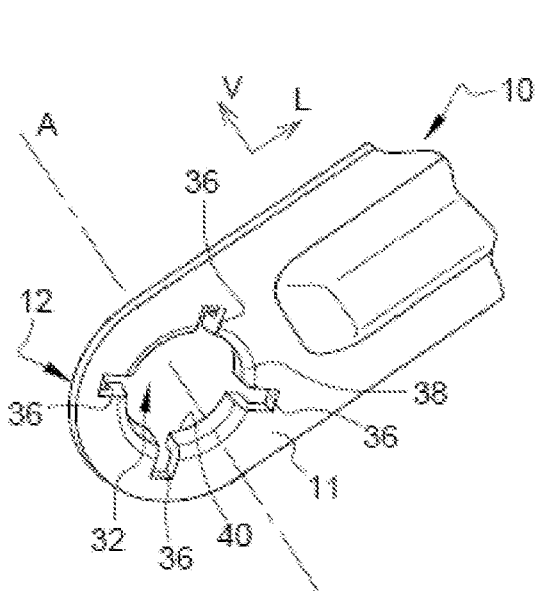
FIG. 3 is a detailed perspective view from beneath, of the end of the connecting rod comprising the locking hole.
Figure 4:
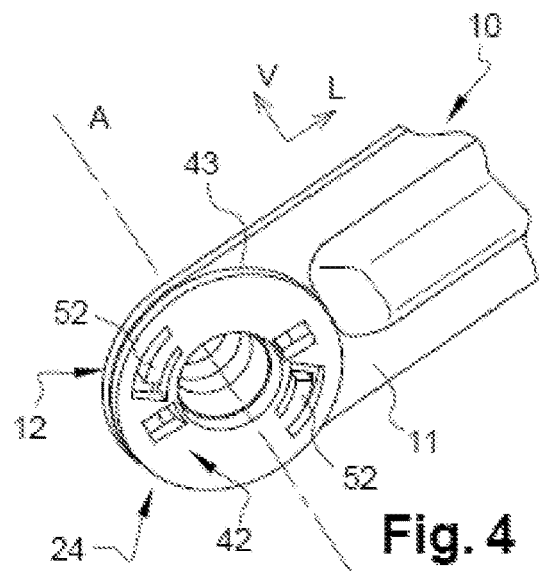
FIG. 4 is a detailed perspective view from beneath of the end of the connecting rod that is equipped with the ball-joint housing in the fitted and angularly blocked position.

As illustrated in detail in FIGS. 1 and 2, the crank 16 takes the form of a cut and pressed sheet-metal plate.

Near its distal end edge 20 and such that it is centered transversely, the plate 17 of the crank 16 comprises a square-section hole which is designed to accept a lower axial section of the driveshaft 14 of complementary cross section, which is fixed therein for example by crimping.

Near its proximal end edge 22 and such that it is centered transversely, the plate 17 of the crank 16 comprises a, for example square-section, hole which is designed to accept a lower axial section of the associated crankpin 18, of complementary cross section, which is fixed therein for example by crimping.

The crankpin 18 is a component oriented axially along its central axis "A", which here by convention corresponds to the vertical axis of the L, V, T trihedron and is oriented from the bottom up.

The crankpin 18 comprises an upper section 26 in the form of part of a spherical ball-joint ball centered on the axis A.

The connecting rod 10 and the crank 16 are here, by convention only, depicted as parallel and horizontal overall, and the end 12 of the connecting rod 10 is here arranged vertically above the end 22 of the crank 16.

The invention is not limited to this arrangement of the end 12 of the connecting rod 10 with respect to the end 22 of the crank 16, and the end 12 of the connecting rod 10 could equally well be arranged vertically below the end 22 of the crank 16.

Likewise, given the ease with which the end 12 of the connecting rod 10 can move with respect to the crankpin 18, the end 12 of the connecting rod 10 is liable to occupy different positions in space with respect to the crank 16, and notably positions in which the end 12 of the connecting rod 10 is not parallel to the crank 16.

The end 22 of the crank 16 is articulated with respect to the end 12 of the connecting rod 10 by a ball-joint connection comprising a ball-joint housing 24 "bayonet" fitted onto the end 12 of the connecting rod 10.

The end 12 of the connecting rod 10 is produced here in the form of a flat plate extending horizontally. It comprises a locking orifice 32 through which the ball-joint housing 24 is fixed to the end 12 of the connecting rod 10 by a fitting of the so-called bayonet fitting type.

The ball-joint housing 24 is a component produced by injection molding of plastics material so as to allow the upper end 26 of the crankpin 18 to be elastically push-fitted into a concave spherical housing portion 28 of the ball-joint housing 24.

The housing portion 28 of the ball-joint housing 24 opens axially downward, toward the end 22 of the crank 16, via a lower opening 30 through which the spherical-frustum upper end 26 of the crankpin 18 is fitted into the concave spherical hollow housing portion 28.

In order to articulate the end 12 of the connecting rod 10 to the end 22 of the crank 10, the upper end 26 is spherical in shape and the housing portion 28 of the ball-joint housing 24 is of complementary concave spherical shape.

The center "C" of the housing portion 28 defines a center point for the articulation of the end 12 of the connecting rod 10 with respect to the crank 16.

The plate-shaped end 12 of the connecting rod 10 is delimited by a lower face 11 and an upper face 13 which are opposite, planar, and parallel.

In order to fit the ball-joint housing 24, the end 12 of the connecting rod 10 comprises a central locking hole 32 which is formed by making a cutout and pressing.

The locking hole 32 thus extends through the thickness of the sheet metal of which the end 12 of the connecting rod 10 is made and extends vertically upward via a pressed tubular axial skirt 34 which extends vertically upward above the plane of the upper face 13.

Thus, the locking hole 32 is substantially concave frustoconical of circular cross section, reducing in diameter from the bottom up.

The end 12 of the connecting rod 10 comprises over its entire thickness and that of the skirt 34, four radial slots 36, here distributed angularly at right angles about the central axis A of the locking hole 32.

Each radial slot 36 opens vertically at the bottom and vertically at the top and radially to the inside of the locking hole 32.

Each radial slot 36 also extends radially beyond the outside diameter of the base of the skirt 34.

Each radial slot 36 has parallel and opposite vertical radial walls.

As a result of the radial slots 36, the skirt 34 is divided into four angular sectors 38, of which each is capable here, within the meaning of the invention, of acting as a locking lug in the aforementioned bayonet fitting.

Each locking lug is delimited vertically at the top by an upper face 40.

Figure 7:
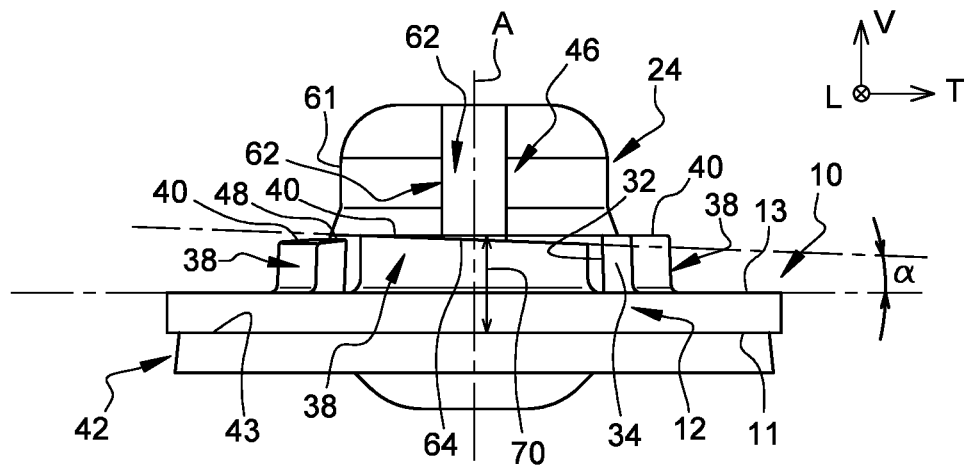
FIG. 7 is a longitudinal end-on view in the direction of the arrow F in FIG. 5.

Each upper face 40 is substantially planar and is inclined with respect to the planar horizontal upper face 13 of the end 12 of the connecting rod 10 by an angle alpha (see FIG. 7) of a few degrees of angle so as to form an axial-clamping slope or ramp as will be explained later.

The upper faces of the four locking lugs 38 are inclined in the same direction about the axis A.

The ball-joint housing 24 that complements the end 12 of the connecting rod 10 essentially comprises a lower annular plate 42, an intermediate section 44, and an upper section 46 for grasping, so that the ball-joint housing can be turned (rotated).

The lower annular plate 42 is delimited vertically towards the top by an annular radial upper face 43 and has the lower opening 30 at its center.

The lower annular plate 42 here comprises two diametrically opposite blocking pawls 50 which are produced as a molded-in part of the ball-joint housing 24.

Each blocking pawl 50 comprises an elastically deformable tab 52 which, in its state of rest, extends in the plane of the lower annular plate 42 and which, at its free end, bears a blocking finger 54 which extends axially as a projection, vertically upward above the horizontal plane of the annular radial upper face 43.

Each blocking finger is delimited vertically upward by a planar upper facet 56 and circumferentially by two inclined opposite vertical facets 58.

Each blocking finger 54 is dimensioned so that it can be received vertically, from the bottom up, in a slot 36 which then acts as a blocking recess within the meaning of the invention.

As a result of the design with two inclined facets 58, each blocking finger 50, when push-fitted elastically into a slot 36, absorbs any angular clearance, about the axis A, between the ball-joint housing 24 and the end 12 of the connecting rod 10.

The intermediate section 44 of the ball-joint housing 24 is delimited radially by a frustoconical convex lateral wall 45 of which the profile and dimensions complement those of the locking hole 32 of the end 12 of the connecting rod 10.

Collaboration between the complementing frustoconical profiles allows clearances between the axis of the intermediate section 44 of the ball-joint housing 24 and the axis of the locking hole 32 of the end 12 of the connecting rod 10 to be absorbed so that these components can be aligned on a common vertical axis A.

In order to absorb the radial clearances in the collaboration between the complementing frustoconical profiles, the external surface of the frustoconical convex lateral wall 45 may be provided with external axial ribs 48.

The upper section 46 for grasping comprises a hollow central body 60 delimited by an external lateral wall 61 with dimensions smaller than those of the external lateral wall 45 of the intermediate section 44.

The upper section 46 for grasping also comprises two diametrically opposite wings 62 which each extend radially and vertically from the external lateral wall 61 of the hollow central body 60.

Figure 5:
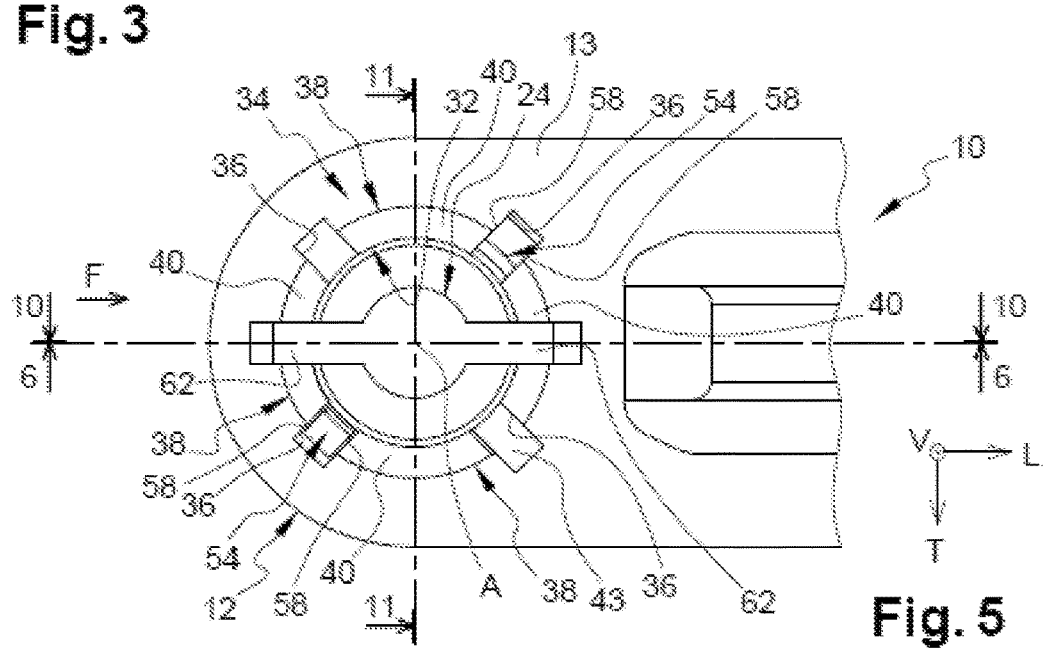
FIG. 5 is a view from above of the elements illustrated in FIG. 4.
Figure 6:
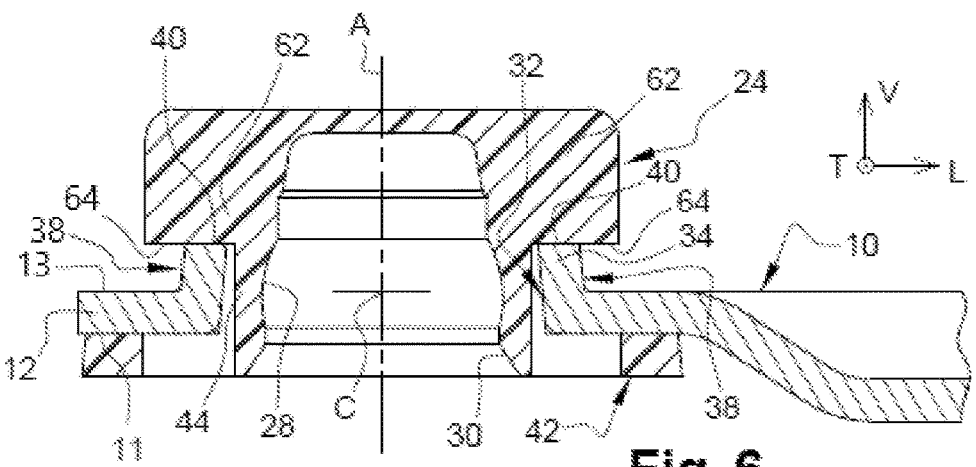
FIG. 6 is view in section on the line 6-6 of FIG. 5.
Figure 9:
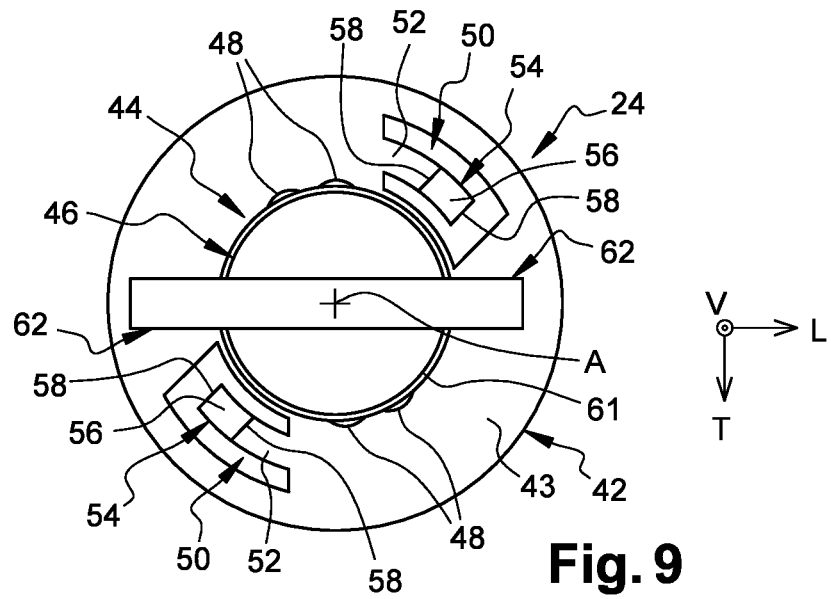
FIG. 9 is a view from above of the ball-joint housing illustrated in the preceding figures.
Figure 10:
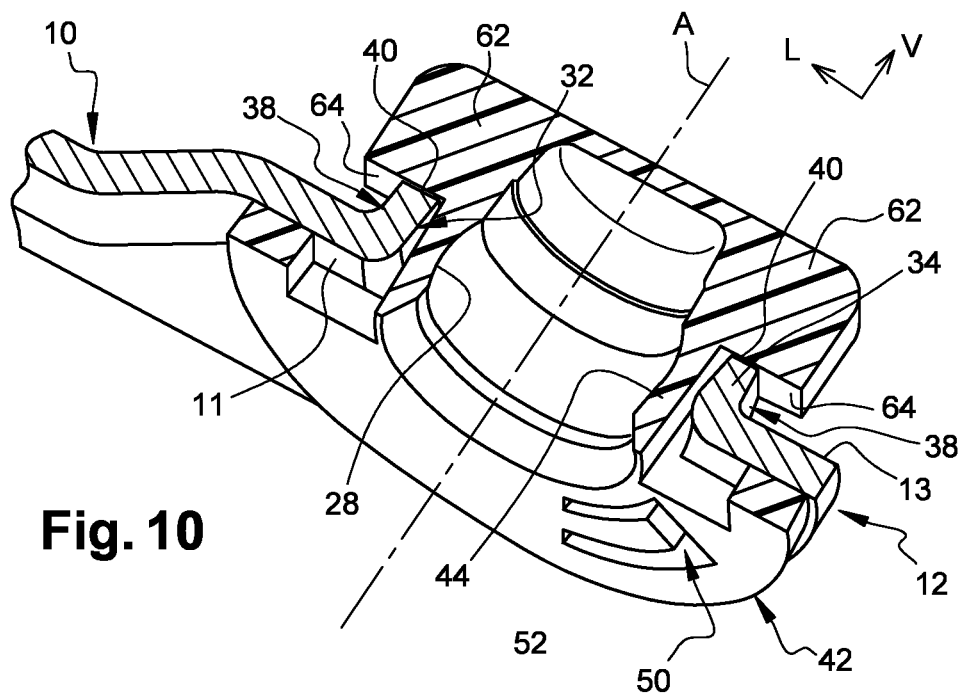
FIG. 10 is view in perspective and in section on the line 10-10 of FIG. 5.
Figure 11:
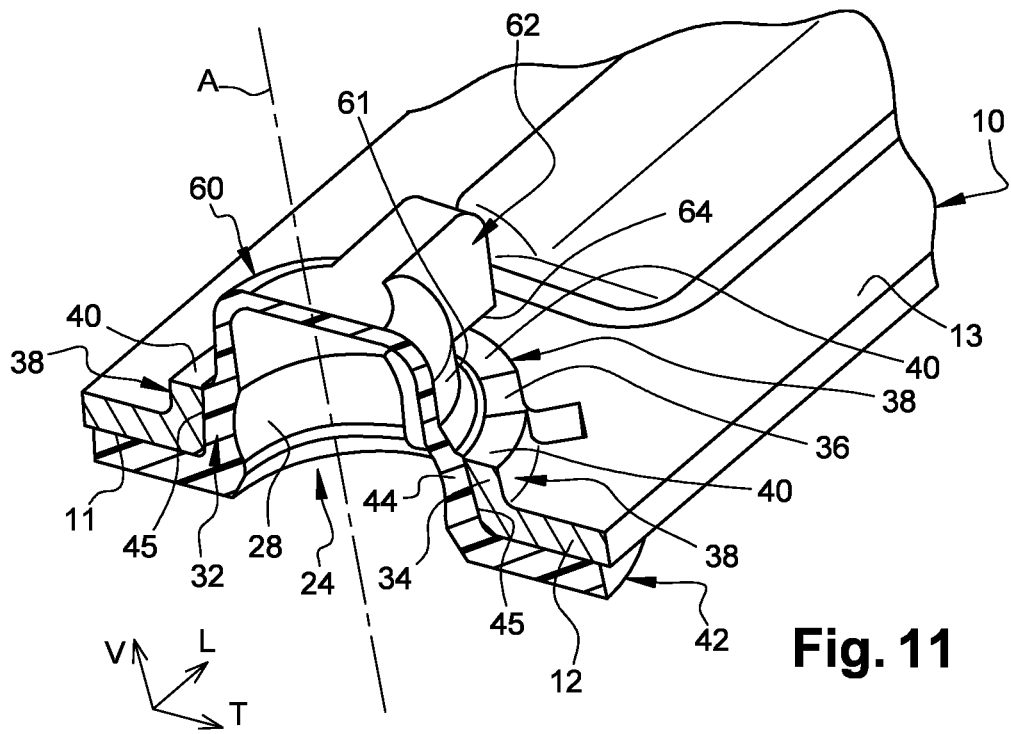
FIG. 11 is view in perspective and in section on the line 11-11 of FIG. 5.

As can be seen in FIGS. 5 and 9, each blocking finger 54 is angularly offset by 45 degrees of angle with respect to an adjacent wing 62.

Each radial wing 62 is delimited vertically downward by a substantially horizontal lower face 64.

Figure 8:
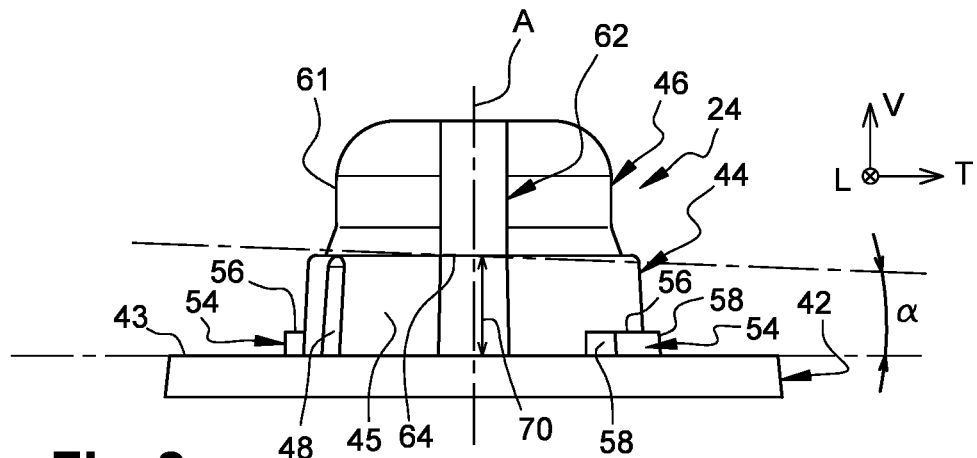
FIG. 8 is a longitudinal end-on view of the ball-joint housing illustrated in FIGS. 5 to 7.

Each lower face 64 is substantially planar and is inclined with respect to the planar horizontal upper face 43 of the lower annular plate 42 of the ball-joint housing 24 by an angle alpha (see FIG. 8) of a few degrees of angle (equal or substantially equal to the angle alpha of inclination of the upper face 40) so as to form an axial-clamping slope or ramp collaborating with the surface 40 opposite.

In line with each of the radial wings 62, the ball-joint housing 24 delimits a locking notch 70.

Each locking notch 70 is delimited vertically by a lower face 64 and by a portion opposite belonging to the upper annular face 43.

In order to assemble and fit the components, and as illustrated in FIG. 2, it is possible for example to begin by elastically push-fitting the ball-joint housing 24 onto the spherical upper end 26 of the crankpin 18, which is then housed with the ability to rotate in the concave spherical housing portion 28 of the ball-joint housing 24.

For the bayonet-fitting of the end 12 of the connecting rod 10 onto the ball-joint housing 24, it is necessary, as has been illustrated in FIG. 2, to align the two wings 62 angularly with two diametrically opposite radial slots 36.

In this relative angular position, it is possible for the upper section 46 to be introduced axially through the locking orifice 32, and then the intermediate section 44, until the lower face 11 of the end 12 of the connecting rod 10 comes into abutment and contact with the upper annular face 43 of the lower annular plate 42 of the ball-joint housing 24.

Portions opposite, belonging to the solid horizontal lower face 11 of the end 12 of the connecting rod 10 press on the upper facets 56 of the blocking fingers to cause these fingers to retract downward by elastic deformation of the tabs 52 of the blocking pawls 50.

Once this "axial" travel has been completed, the bayonet-fitting continues with the relative rotation of the end 12 of the connecting rod 10 about the vertical axis A, with respect to the ball-joint housing.

During this relative rotation—here by approximately 45 degrees of angle—a locking lug 38 angularly enters an adjacent locking notch 70 until each blocking finger 54 elastically enters a radial slot 36, which then acts as a locking recess.

In this relative angular position illustrated in FIG. 5, the assembly is fitted, locked and blocked in the angular locking position.

Upon relative rotation, the ramp-effect inclined faces 40 and 64 collaborate with one another to provide the axial clamping effect according to the invention.

What is claimed is:

1. An assembly belonging to a movement-transmission mechanism for driving the rotation of a motor vehicle wiper, this assembly comprising a crankpin, of axial orientation (A), which comprises a ball-joint ball, and a connecting rod which bears a ball-joint housing that houses the ball-joint ball, in which assembly the ball-joint housing and the connecting rod are assembled by bayonet fitting, and wherein:

the connecting rod has a locking hole through which there passes axially, from the bottom up, an axial section of the ball-joint housing;
the connecting rod comprises at least one locking lug;
the ball-joint housing comprises a locking notch which is delimited by two opposite radial faces;
the ball-joint housing is locked in axial position with respect to the connecting rod by relative rotation of the ball-joint housing with respect to the connecting rod by engaging said at least one locking lug in the locking notch,
characterized in that one of the two opposite radial faces of the locking notch and a face opposite belonging to the locking lug each have inclined (alpha) profiles that complement one another so that, upon said rotation, the locking lug becomes axially clamped inside the locking notch.

2. The assembly as claimed in claim 1, characterized in that a convex lateral face of said axial section of the ball-joint housing and a concave internal wall of the locking hole have frustoconical profiles that complement one another so as to absorb, upon said axial clamping, any clearance between an axis of said axial section of the ball-joint housing and an axis of the locking hole in the connecting rod.

3. The assembly as claimed in claim 1, characterized in that, in a locked angular position in which said at least one locking lug is engaged in the locking notch, the ball-joint housing is blocked in terms of angular position with respect to the connecting rod by the elastic push-fitting of a blocking finger into a blocking recess.

4. The assembly as claimed in claim 3, characterized in that the blocking finger is borne by an elastically deformable tab which is connected to the ball-joint housing, and in that the blocking recess is formed in the connecting rod.

5. The assembly as claimed in claim 3, characterized in that the blocking finger extends in a direction parallel to an axis of rotation of the ball-joint housing with respect to the connecting rod.

6. The assembly as claimed in claim 3, characterized in that the blocking finger and the blocking recess have profiles that complement one another so that when the ball-joint housing is in the locked angular position with respect to the connecting rod, any angular clearance between these two elements is absorbed.

7. The assembly as claimed in claim 1, characterized in that the ball-joint housing comprises an upper section for grasping so as to rotate the ball-joint housing with respect to the connecting rod which comprises a central body and two radial wings extending out from the central body.

8. The assembly as claimed in claim 7, characterized in that an external lateral contour of the upper section for grasping of the ball-joint housing complements an internal contour of the locking hole.

9. The assembly as claimed in claim 8, characterized in that the ball-joint housing comprises a lower annular plate of which an upper face constitutes one of the two opposite radial faces of the locking notch.

10. The assembly as claimed in claim 9, characterized in that the locking notch is delimited axially:
downward by said upper face of the lower annular plate of the ball-joint housing;
and upward by a lower face opposite, belonging to the upper section of the ball-joint housing consisting of two angular portions of which each is the lower face of one radial wing.

* * * * *